US012044462B2

(12) United States Patent
Ham et al.

(10) Patent No.: US 12,044,462 B2
(45) Date of Patent: Jul. 23, 2024

(54) REFRIGERATOR

(71) Applicant: SAMSUNG ELECTRONICS CO., LTD., Suwon-si (KR)

(72) Inventors: Hyungkwen Ham, Suwon-si (KR); Hyeonkyu Lim, Suwon-si (KR); Hyunuk Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 17/737,110

(22) Filed: May 5, 2022

(65) Prior Publication Data

US 2022/0260304 A1 Aug. 18, 2022

Related U.S. Application Data

(63) Continuation of application No. PCT/KR2020/012241, filed on Sep. 10, 2020.

(30) Foreign Application Priority Data

Nov. 8, 2019 (KR) ........................ 10-2019-0142209

(51) Int. Cl.
*F25D 23/02* (2006.01)
*E05B 65/00* (2006.01)
(Continued)

(52) U.S. Cl.
CPC ........ *F25D 23/028* (2013.01); *E05B 65/0042* (2013.01); *E05C 3/162* (2013.01);
(Continued)

(58) Field of Classification Search
CPC ................. F25D 23/025; F25D 23/028; F25D 2323/023; F25D 23/04; F25D 23/02;
(Continued)

(56) References Cited

U.S. PATENT DOCUMENTS 3,086,830 A * 4/1963 Malia ...................... F25D 23/04 62/448
9,518,777 B2 12/2016 Lee et al.
(Continued)

FOREIGN PATENT DOCUMENTS

KR 10-2006-0122497 11/2006
KR 10-1395189 5/2014
(Continued)

OTHER PUBLICATIONS

Machine translation for KR101833831 (Year: 2018).*
International Search Report PCT/ISA/210 dated Jan. 15, 2021 in International Patent Application No. PCT/KR2020/012241.

*Primary Examiner* — Hiwot E Tefera
(74) *Attorney, Agent, or Firm* — STAAS & HALSEY LLP

(57) ABSTRACT

A refrigerator including an inner door rotatably coupleable to a cabinet to open and close a storage compartment, the inner door having an opening, an outer door rotatably coupleable to the front of the inner door to open and close the opening of the inner door, a hook locking groove formed on the inner door, a manipulation handle provided to be rotatable with respect to a transverse shaft coupleable to the outer door and including a movable contact part, and a locking member provided to be rotatable with respect to a longitudinal shaft coupled to the outer door, wherein the locking member includes a hook lockable to and unlockable from the hook locking groove, and a passive contact part to selectively contact with the movable contact part.

14 Claims, 11 Drawing Sheets

(51) Int. Cl.
*E05C 3/16* (2006.01)
*F25D 23/04* (2006.01)

(52) U.S. Cl.
CPC ........... *F25D 23/025* (2013.01); *F25D 23/04* (2013.01); *E05Y 2900/31* (2013.01); *F25D 2323/023* (2013.01)

(58) Field of Classification Search
CPC ...... E05B 65/0042; E05C 3/162; E05C 3/124; E05Y 2900/31
See application file for complete search history.

(56) References Cited

U.S. PATENT DOCUMENTS

| | | | | |
|---|---|---|---|---|
| 10,087,658 | B2 * | 10/2018 | Gresham, IV | F25D 25/025 |
| 11,359,414 | B2 * | 6/2022 | Ayyawar | E05C 7/02 |
| 2015/0069900 | A1 * | 3/2015 | Lim | F25D 23/028<br>312/405 |
| 2015/0176886 | A1 * | 6/2015 | Lee | F25D 23/04<br>312/405 |
| 2015/0241116 | A1 * | 8/2015 | Choi | F25D 23/00<br>312/405 |
| 2015/0260443 | A1 * | 9/2015 | Lee | E05C 3/14<br>312/405 |
| 2017/0038126 | A1 | 2/2017 | Lee et al. | |
| 2018/0120020 | A1 * | 5/2018 | Lee | E05C 1/12 |
| 2018/0202707 | A1 * | 7/2018 | Park | F25D 23/04 |
| 2021/0239386 | A1 * | 8/2021 | Yoon | E05C 3/162 |
| 2021/0372689 | A1 * | 12/2021 | Park | F25D 23/04 |
| 2022/0128290 | A1 * | 4/2022 | Jeon | F25D 23/028 |

FOREIGN PATENT DOCUMENTS

| | | |
|---|---|---|
| KR | 10-2015-0099024 | 8/2015 |
| KR | 10-1788064 | 10/2017 |
| KR | 10-2017-0124239 | 11/2017 |
| KR | 10-1833831 | 3/2018 |

* cited by examiner

REFRIGERATOR

CROSS-REFERENCE TO RELATED APPLICATION(S)

This application is a continuation application, under 35 U.S.C. § 111(a), of International Patent Application No. PCT/KR2020/012241, filed on Sep. 10, 2020, which claims the benefit of Korean Patent Application No. 10-2019-0142209, filed on Nov. 8, 2019, in the Korean Intellectual Property Office, the entire disclosures of which are herein incorporated by reference as a part of this application.

BACKGROUND

Field

The present disclosure relates to a refrigerator, and more particularly, to a refrigerator having an inner door for opening and closing a storage compartment and an outer door installed outside the inner door.

Description of Related Art

In general, a refrigerator is an appliance that includes a main body having a storage compartment and a cold air supply system for supplying cold air to the storage compartment to keep food fresh. The storage compartment includes a refrigerating compartment that is maintained at temperature of about 0 degrees Celsius to 5 degrees Celsius to keep food refrigerated, and a freezing compartment that is maintained at temperature of about 0 degrees Celsius to −30 degrees Celsius to keep food frozen.

Recently, a refrigerator having a double door in which an outer door is mounted on an inner door that opens and closes a storage compartment is provided. That is, a refrigerator in which a user may use the storage compartment by opening the inner door and may use an auxiliary storage compartment by opening the outer door in a state in which the inner door is closed is provided.

SUMMARY

An aspect of the present disclosure provides a refrigerator including a cabinet having a storage compartment, an inner door rotatably coupleable to the cabinet to open and close the storage compartment, the inner door having an opening, an outer door rotatably coupleable to the front of the inner door to open and close the opening of the inner door, a hook locking groove formed on the inner door, a manipulation handle provided to be rotatable with respect to a transverse shaft coupleable to the outer door and including a movable contact part, and a locking member provided to be rotatable with respect to a longitudinal shaft coupleable to the outer door, wherein the locking member includes a hook lockable to and unlockable from the hook locking groove, and a passive contact part to selectively contact with the movable contact part.

The passive contact part may be provided not to interfere with the movable contact part while the hook rotates along a direction in which the hook is released from the hook locking groove in a state in which the movable contact part and the passive contact part are spaced apart from each other.

The movable contact part may include a fence having an inner surface that is spaced apart from the passive contact part by a predetermined distance and formed to surround a circumference of the passive contact part, and an open cutout portion may be provided on one side of the fence to prevent interference upon relative rotation of the passive contact part and the movable contact part.

A buffer member may be coupleable to the inner surface of the fence.

At least one of the movable contact part and the passive contact part may be provided with a buffer member.

The passive contact part may include a first arm formed to extend from the longitudinal shaft toward an upper portion of the movable contact part, and a second arm formed to extend from the first arm toward the inside of the fence.

The cutout portion may be provided to have a width allowing the second arm to pass therethrough.

The movable contact part may rotate forward and rearward of the storage compartment with respect to the transverse shaft, and the passive contact part may rotate forward and rearward of the storage compartment with respect to the longitudinal shaft.

The manipulation handle may include a lever formed to extend to a lower portion of the transverse shaft, and the movable contact part may be formed to extend to an upper portion of the transverse shaft from a position adjacent to an end of the transverse shaft.

The refrigerator may further include a hook elastic member to provide an elastic force along a direction in which the hook is locked in the hook locking groove.

The refrigerator may further include a handle elastic member to provide an elastic force for rotating the transverse shaft so that the manipulation handle returns to an original position after rotation.

The handle elastic member may be provided to have an elastic force that is relatively greater than or equal to that of the hook elastic member.

The refrigerator may further include a hook housing formed to be embedded inside the outer door to receive a portion of the hook, wherein the handle elastic member may include a torsion spring coupleable to the transverse shaft and having opposite ends supported on the outer door and the manipulation handle, respectively, and the hook elastic member may include a torsion spring coupleable to the longitudinal shaft and having opposite ends supported on the longitudinal shaft and the hook housing, respectively.

The hook may include a body part having a coupling part coupleable to the longitudinal shaft at a lower end and a spring mounting part to which the hook elastic member is coupleable at an upper end, and a hook part formed to extend in a direction of crossing the longitudinal shaft from an outer surface of the body part.

The refrigerator may further include a stopper formed to protrude from an outer surface of the body part to prevent the hook from rotating more than a predetermined angle, wherein the stopper may be provided with a buffer member.

The refrigerator may further include a shaft housing formed to be embedded inside the outer door to surround the longitudinal shaft so as to rotatably support the longitudinal shaft.

Another aspect of the present disclosure provides a refrigerator including a cabinet having a storage compartment, a door including an inner door rotatably coupleable to a front of the cabinet and having a hook locking groove and an outer door provided to cover the front of the inner door and rotatably coupleable to the front of the inner door, a locking member including a longitudinal shaft coupleable to the outer door, a hook provided to rotate integrally with the longitudinal shaft and capable of being locked in and released from the hook locking groove, and a passive contact part provided to rotate integrally with the longitudinal shaft and receive an external force for rotating the longitudinal shaft, and a manipulation handle including a transverse shaft coupleable to the outer door, a lever coupleable to the transverse shaft and provided to rotate toward the front of the door, and a movable contact part provided to apply an external force by coming into contact with the passive contact part while the lever rotates toward the front of the door and to be spaced apart from the passive contact part while the lever is moved to an original position.

The passive contact part and the movable contact part may be provided not to be interlocked with each other while the passive contact part rotates toward the rear of the door with respect to the longitudinal shaft when the lever is in an initial position.

The locking member may further include a body inserted into the transverse shaft to provide an elastic force along a direction in which the hook is locked in the hook locking groove, and a torsion spring in which opposite ends of the body are supported by the outer door and the transverse shaft, respectively.

Another aspect of the present disclosure provides a refrigerator including a door including an inner door having a hook locking groove and an outer door rotatably coupleable to the front of the inner door, a locking member including a longitudinal shaft coupleable to the outer door in a state of being elastically supported on a hook elastic member, a hook formed to extend in a transverse direction from an upper side of the longitudinal shaft, and a passive contact part formed to extend in the transverse direction from the lower side of the longitudinal shaft, and a manipulation handle including a transverse shaft coupleable to the outer door in a state of being elastically supported on a handle elastic member, a lever formed to extend to a lower portion of the transverse shaft, and a movable contact part extending to an upper portion of the transverse shaft, wherein the movable contact part is provided to be movable together with the passive contact part by coming into contact with the passive contact part after passing a section of relatively moving with respect the passive contact part when the lever is pulled toward the front of the door, the passive contact part is provided to be rotatable between a contact position capable of contacting the movable contact part and a locking position in which the hook is locked in the hook locking groove, and the passive contact part is provided not to interfere with the movable contact part in a rotational trajectory of the passive contact part rotating from the contact position to the locking position when the lever is in an initial position in which the lever is not operated.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
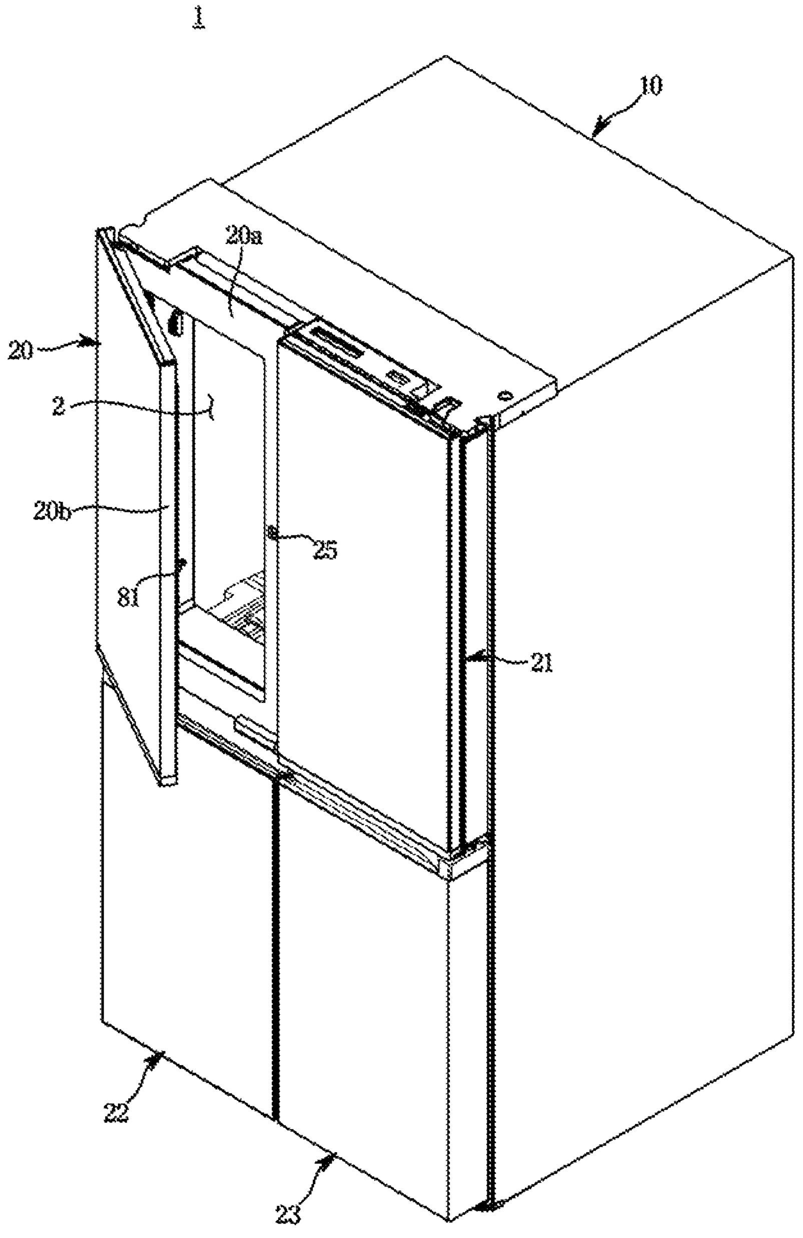
FIG. 1 is a perspective view illustrating a refrigerator according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

The present disclosure is directed to providing a refrigerator with improved opening/closing operability of an outer door in a refrigerator having a double door.

The present disclosure is directed to providing a refrigerator capable of reducing noise generation when an outer door is opened or closed.

The present disclosure is directed to providing a refrigerator capable of improving productivity through cost reduction by simplifying an opening/closing structure of an outer door.

According to the present disclosure, because an outer door can be opened by only one operation of pulling the outer door, a refrigerator with improved ease of use can be provided.

According to the present disclosure, a refrigerator with improved emotional quality can be provided by minimizing noise generated when the outer door is opened or closed.

Figure 2:
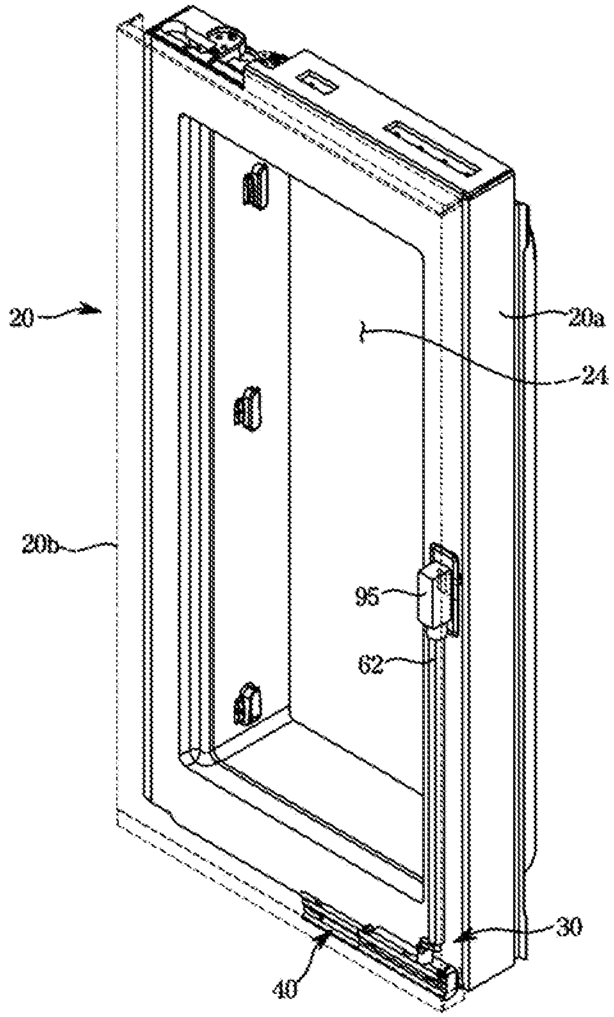
FIG. 2 is a perspective view illustrating a locking device installed on a door according to an embodiment of the present disclosure.

FIG. 1 is a perspective view illustrating a refrigerator according to an embodiment of the present disclosure, and FIG. 2 is a perspective view illustrating a locking device installed on a door according to an embodiment of the present disclosure.

Referring to FIGS. 1 and 2, a refrigerator 1 includes a cabinet 10 forming a storage compartment 2, a door 20 provided to open and close the storage compartment 2, and a cold air supply device (not shown) provided to supply cold air to the storage compartment 2.

The cold air supply device may include a compressor, a condenser, an expansion valve, an evaporator, a blowing fan, and a cold air duct.

A machine compartment (not shown) in which the compressor to compress a refrigerant and a condenser to condense the compressed refrigerant are installed may be provided at a lower rear of the cabinet 10.

The cabinet 10 may include an inner case forming the storage compartment 2, an outer case coupled to the outside of the inner case to form an outer appearance, and a heat insulator foamed between the inner case and the outer case to insulate the storage compartment 2.

The storage compartment 2 may be partitioned into a plurality of storage chambers by partitions, and a plurality of shelves and storage containers may be provided in the storage compartment 2.

The storage compartment 2 may be partitioned into two of upper and lower storage chambers by a horizontal partition, and the lower storage chamber may be partitioned into two of left and right storage chambers by a vertical partition.

The storage compartment 2 has an open front such that food may be put in and out, and the opened front may be opened and closed by the door 20.

The door 20 may include a pair of upper doors 20 and 21 provided to open and close the upper portion of the storage compartment 2 and a pair of lower doors 22 and 23 provided to open and close both the left and right sides of the lower portion of the storage compartment 2.

The pair of upper doors 20 and 21 and the pair of lower doors 22 and 23 may be coupled to the cabinet 10 to be rotatable about hinges at both the left and right sides of the cabinet 10.

At least one of the pair of upper doors 20 and 21 may be configured as a double door.

Hereinafter, the left upper door 20 of the pair of upper doors 20 and 21 will be described as an example, but the present disclosure is not limited thereto. Hereinafter, the upper door 20 will be referred to as a door for convenience.

The door 20 includes an inner door 20*a* rotatably mounted to one side of the cabinet 10, and an outer door 20*b* rotatably mounted to the inner door 20*a* or the cabinet 10.

The inner door 20*a* may open and close the storage compartment 2, and the outer door 20*b* may open and close a front surface or a portion of the front surface of the inner door 20*a*.

The inner door 20*a* and the outer door 20*b* may open and close the storage compartment 2 together, and the outer door 20*b* may separately open and close the inside of the inner door 20*a* in the storage compartment 2.

An opening 24 communicating with the storage compartment 2 may be provided on the inner door 20*a*, and the outer door 20*b* may be provided to open and close the opening 24 of the inner door 20*a*.

An auxiliary storage chamber or a door guard may be provided on a rear side of the inner door 20*a*. The opening 24 of the inner door 20*a* may be an entrance to the auxiliary storage compartment or door guard.

A user may access the auxiliary storage chamber or door guard of the inner door 20*a* or the storage compartment 2 through the opening 24 by opening the outer door 20*b*.

The outer door 20*b* may be opened separately from the inner door 20*a* or may be opened integrally with the inner door 20*a*. For this, a hook locking groove 25 may be provided on the inner door 20*a*, and the outer door 20*b* may be provided with a locking device 30 having a hook part 81 capable of being locked or released in or from the hook locking groove 25.

Figure 3:
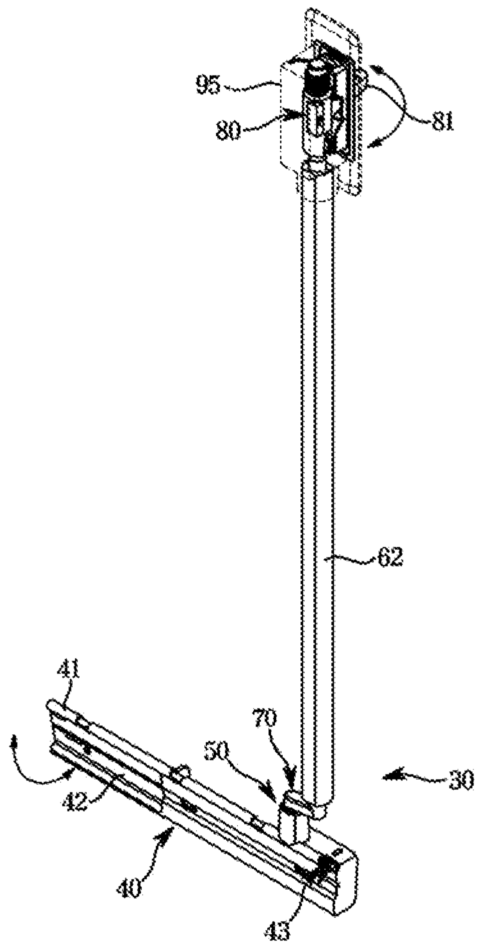
FIG. 3 is a perspective view illustrating the locking device of FIG. 2 according to an embodiment of the present disclosure.
Figure 4:
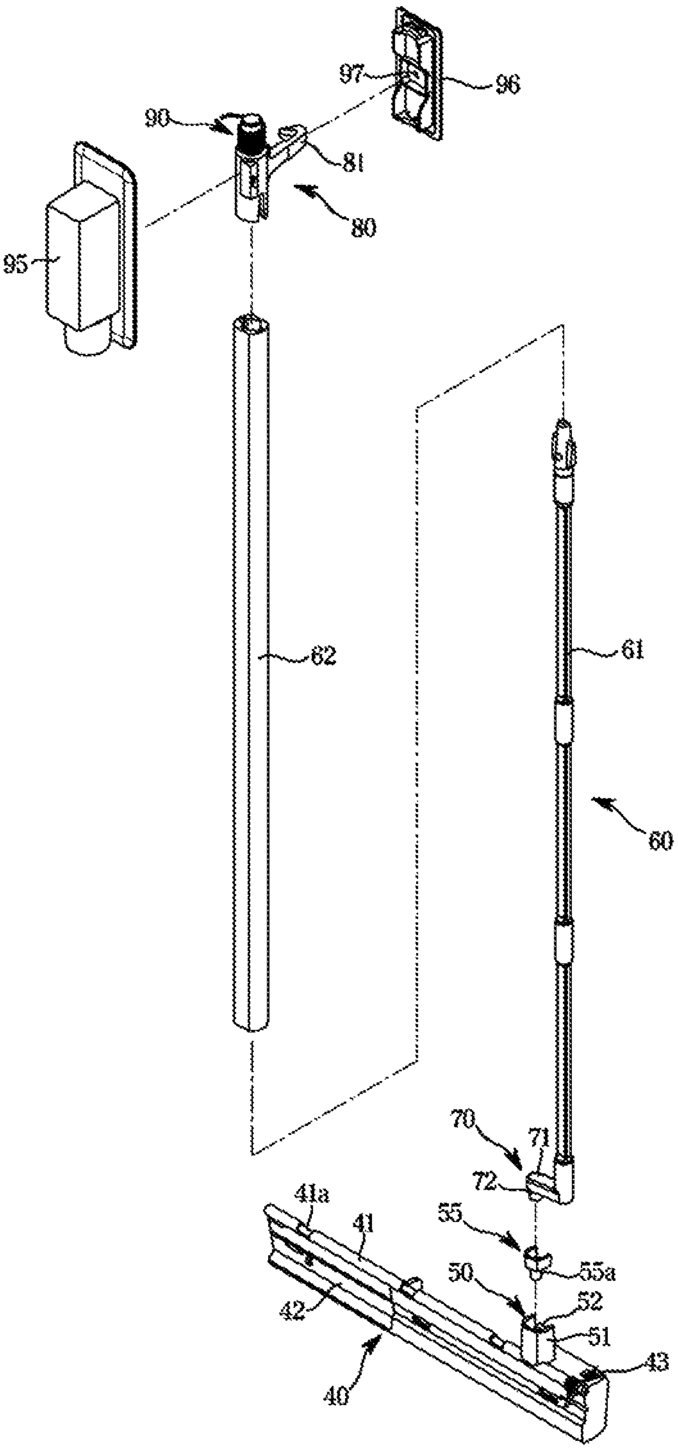
FIG. 4 is an exploded perspective view of the locking device of FIG. 3 according to an embodiment of the present disclosure.
Figure 5:
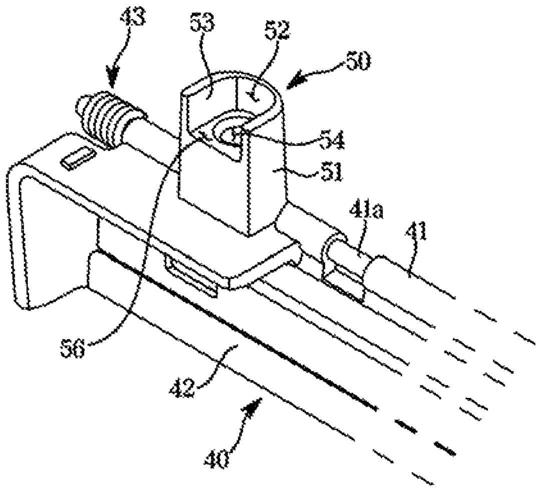
FIG. 5 is an enlarged view of a movable contact part of FIG. 4 according to an embodiment of the present disclosure.
Figure 6:
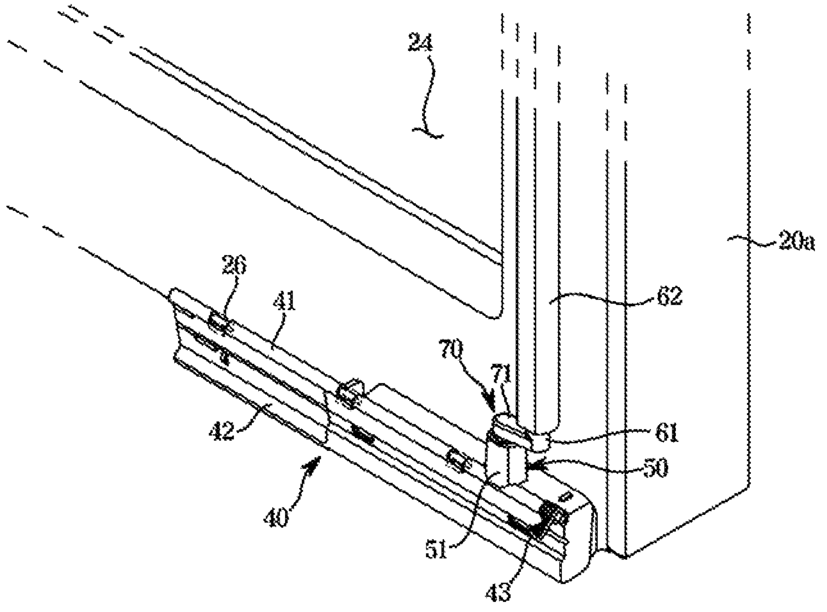
FIG. 6 is an enlarged view of a manipulation handle of FIG. 2 according to an embodiment of the present disclosure.
Figure 7:
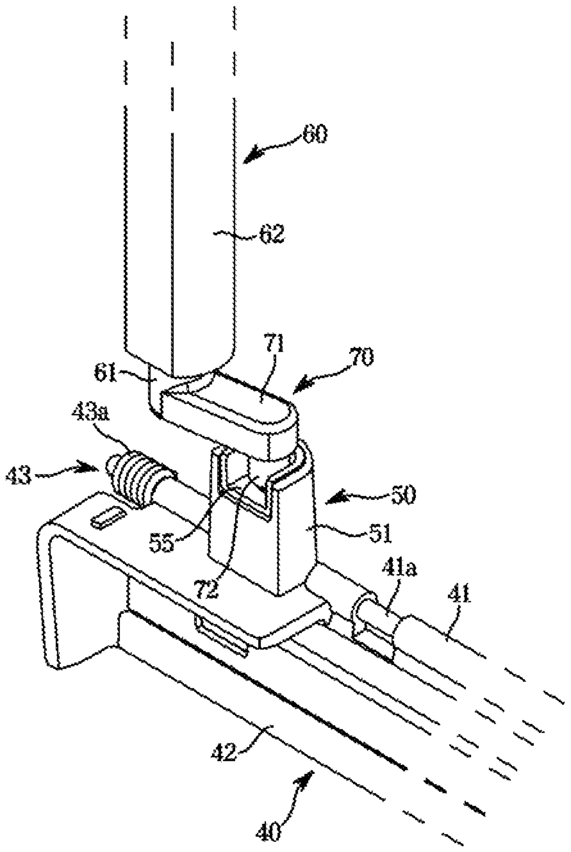
FIG. 7 is a view illustrating the rear of the manipulation handle of FIG. 5 according to an embodiment of the present disclosure.
Figure 8:
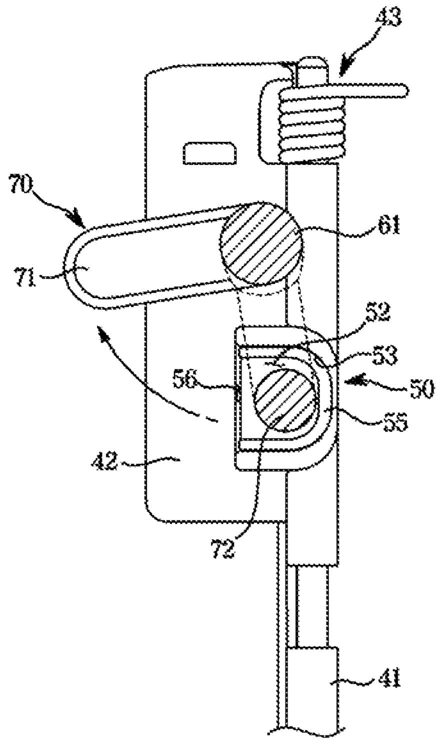
FIG. 8 is a view illustrating an operation in which a passive contact part is rotated according to an embodiment.

FIG. 3 is a perspective view illustrating the locking device of FIG. 2, FIG. 4 is an exploded perspective view of the locking device of FIG. 3, FIG. 5 is an enlarged view of a movable contact part of FIG. 4, FIG. 6 is an enlarged view of a manipulation handle of FIG. 2, FIG. 7 is a view illustrating the rear of the manipulation handle of FIG. 5, and FIG. 8 is a view illustrating an operation in which a passive contact part is rotated according to an embodiment.

Referring to FIGS. 3 to 8, the locking device 30 according to an embodiment of the present disclosure includes a manipulation handle 40 coupled to the inside of a lower inside of the outer door 20*b* and having a movable contact part 50, and a locking member 60 coupled to the inside of one side of the outer door 20*b* in a state of being spaced apart from the manipulation handle 40 and having a passive contact part 70 capable of selectively contacting the movable contact part 50.

The manipulation handle 40 may be installed rotatably toward the front of the door 20 with respect to a transverse shaft 41 rotatably coupled to the lower side of the outer door 20*b*.

The transverse shaft 41 of the manipulation handle 40 may be formed in a long rod shape from side to side and rotatably coupled to a plurality of shaft supports 26 provided inside the outer door 20*b*.

A plurality of shafts 41*a* having a smaller diameter than that of the transverse shaft 41 may be provided on the transverse shaft 41 at predetermined intervals along an axial direction of the transverse shaft 41 so as to be coupled to the plurality of shaft supports 26.

The manipulation handle 40 includes a lever 42 capable of being manipulated by the user from the outside of the outer door 20*b*, and the movable contact part 50 provided to operate the locking member 60 by the operation of the lever 42.

The lever 42 may be formed in a rectangular panel shape extending downward from the transverse shaft 41 and rotate toward the front of the outer door 20*b* with respect to the transverse shaft 41. The lever 42 may have a width corresponding to the entire axial length of the transverse shaft 41.

The lever 42 may be coupled to rotate integrally with the transverse shaft 41, and the user may rotate the transverse shaft 41 together with the lever 42 by pulling the lever 42 toward the outer door 20*b*.

The lever 42 may be accommodated in a receiving space provided at a lower side of the outer door 20*b* not to be exposed in front of the outer door 20*b*.

The user may pull the lever 42 in a state of putting a hand into the receiving space provided at the lower side of the outer door 20*b*. When the user rotates the lever 42 in a pulling direction, the hook part 81 locked in the hook locking groove 25 may be released, and the outer door 20*b* may be opened at the same time. As such, because the outer door 20*b* may be opened with only one operation of pulling the lever 42, the operation of opening the outer door 20*b* may be easily performed.

The lever 42 may be elastically supported by a handle elastic member 43 coupled to the transverse shaft 41.

The handle elastic member 43 may provide an elastic force for moving the lever 42 to an original position when an external force is removed in a state in which the lever 42 is pulled toward the front of the outer door 20*b*.

The handle elastic member 43 may include a body 43*a* fitted to an end of the transverse shaft 41, and a torsion spring in which opposite ends of the body 43*a* are supported by the outer door 20*b* and the lever 42, respectively.

The movable contact part 50 may be formed to extend above the transverse shaft 41 at a position adjacent to the end of the transverse shaft 41.

The movable contact part 50 may be disposed at a position adjacent to the end of the transverse shaft 41 to which the handle elastic member 43 is coupled.

The movable contact part 50 may rotate integrally with the lever 42 when the lever 42 rotates.

When the lever 42 rotates toward the front of the outer door 20*b*, the movable contact part 50 may rotate toward the rear (storage compartment side) of the outer door 20*b*.

The movable contact part 50 includes a movable body 51 formed to extend above the transverse shaft 41, and a recess 52 may be formed at an upper end of the movable body 51.

The movable body 51 may be formed in a cylindrical or angular column shape.

A fence 53 provided to surround a circumference of the passive contact part 70 may be formed on the recess 52.

The fence 53 may be positioned to be spaced apart from the passive contact part 70 by a predetermined distance.

The fence 53 may press the passive contact part 70 when rotating toward the rear of the outer door 20*b* with respect to the transverse shaft 41.

When the lever 42 is pulled toward the front of the outer door 20*b*, the fence 53 may come into contact with the passive contact part 70 after passing a section of relatively moving to approach the passive contact part 70.

After the fence 53 comes into contact with the passive contact part 70, the fence 53 may move together with the passive contact part 70.

A buffer member 55 capable of reducing impact and noise generation when coming into contact with the passive contact part 70 may be provided inside the fence 53.

The buffer member 55 is a member that suppresses the generation of noise by buffering the impact when the fence 53 approaches and collides with the passive contact part 70, and may be made of a silicone or rubber material having excellent elasticity.

The buffer member 55 may be configured to cover a bottom of the recess 52 and an inner surface of the fence 53.

The buffer member 55 may be provided with a press-fit protrusion 55*a* press-fitted to a coupling hole 54 formed on the bottom of the recess 52.

An open cutout portion 56 may be provided at the rear of the recess 52.

The cutout portion 56 may be formed by cutting the rear of the fence 53.

The cutout portion 56 may have a width through which the passive contact part 70 may pass.

When the cutout portion 56 is formed at the rear of the recess 52, the rear of the buffer member 55 may also have an opening corresponding to the cutout portion 56.

The cutout portion 56 may be provided such that the passive contact part 70 does not interfere with the movable contact part 50 in a rotational trajectory of the passive contact part 70 rotating toward the storage compartment 2. That is, as illustrated in FIG. 8, when the lever 42 is in an initial position in which the lever 42 is not rotated, while the passive contact part 70 rotates toward the rear of the outer door 20*b*, the passive contact part 70 and the movable contact part 50 are not interlocked with each other by the cutout portion 56.

The locking member 60 may include a hook 80 and the passive contact part 70 that are rotatably installed with respect to a longitudinal shaft 61 rotatably coupled to one side of the outer door 20*b*.

The longitudinal shaft 61 may be rotatably supported on the inside of a shaft housing 62 embedded inside the outer door 20*b*.

The shaft housing 62 may be formed in the shape of a long hollow tube in a vertical direction and made of a material having excellent wear resistance and lubricity to reduce rotational frictional resistance. The hook 80 is lockable and unlockable to and from the hook locking groove 25 of the inner door 20*a*, and the passive contact part 70 may selectively come into contact with the movable contact part 50 of the manipulation handle 40.

The passive contact part 70 extends in a transverse direction from a lower end of the longitudinal shaft 61 to receive an external force to rotate the longitudinal shaft 61 from the movable contact part 50, and the hook 80 may be coupled to an upper end of the longitudinal shaft 61 to rotate integrally with the longitudinal shaft 61.

The passive contact part 70 may include a first arm 71 extending in the transverse direction from the lower end of the longitudinal shaft 61, and a second arm 72 extending in a longitudinal direction from an end of the first arm 71.

The first arm 71 may be formed to extend from the lower end of the longitudinal shaft 61 toward an upper side of the movable contact part 50, and the second arm 72 may be formed to extend from a lower end of the first arm 71 toward the inside of the fence 53.

The second arm 72 extending inside the fence 53 may be a part selectively contactable with the movable contact part 50.

The second arm 72 may be positioned in a state of being spaced apart from the fence 53. The second arm 72 may be formed in a cylindrical shape. The second arm 72 may have a relatively smaller diameter than a width of the fence 53.

The cutout portion 56 formed on one side of the fence 53 may be provided to have a width through which the second arm 72 may pass when the second arm 72 of the passive contact part 70 comes into contact with the fence 53.

The second arm 72 of the passive contact part 70 may have a rotational trajectory of rotating around the longitudinal shaft 61 with respect to the longitudinal shaft 61.

The second arm 72 may not interfere with the movable contact part 50 by passing through the cutout portion 56 in the rotational trajectory of the second arm 72 rotating toward the storage compartment 2.

The second arm 72 may rotate between a first position in which the second arm 72 is positioned inside the fence 53 in the state of being spaced apart from the fence 53 by the predetermined distance and a second position in which the second arm 72 locks the hook 80 to the hook locking groove 25. The first position may be a contact position in which the fence 53 is contactable with the second arm 72 after being rotated by a predetermined angle toward the storage compartment 2, and the second position may be a locking position in which the hook 80 coupled to the longitudinal shaft 61 rotating together with the second arm 72 is locked in the hook locking groove 25.

The second arm 72 may be provided with a buffer member (not shown) capable of reducing the generation of impact and noise when coming into contact with the movable contact part 50. The buffer member may be made of a silicone or rubber material having excellent elasticity. The buffer member may be provided to surround an outer surface of the second arm 72.

When the lever 42 of the manipulation handle 40 rotates toward the front of the outer door 20*b*, the movable contact part 50 of the manipulation handle 40 rotates toward the storage compartment 2 with respect to the transverse shaft 41. In this case, the fence 53 of the movable contact part 50 is moved by the predetermined distance, and then comes into contact with the second arm 72 of the passive contact part 70 to apply an external force.

The second arm 72 is rotated toward the storage compartment 2 with respect to the longitudinal shaft 61 by the pressing force of the fence 53. Herein, as the fence 53 and the second arm 72 are positioned in the state of being spaced apart from each other by the predetermined distance in an initial position in which no external force acts, even when the fence 53 and the second arm 72 return to original positions after the external force is removed, the possibility that the fence 53 and the second arm 72 will come into contact with each other is reduced.

Figure 9:
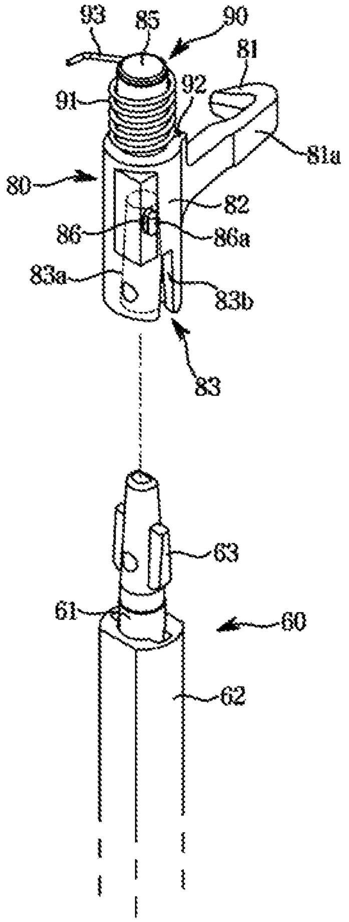
FIG. 9 illustrates a coupling relationship between a hook and a transverse shaft according to an embodiment of the present disclosure.
Figure 10:
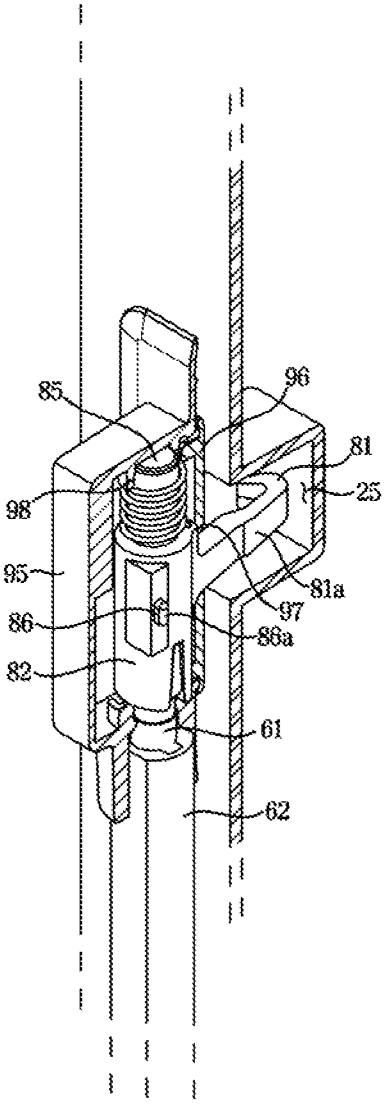
FIG. 10 is a view illustrating that a hook is locked in a hook locking groove according to an embodiment of the present disclosure.
Figure 11:
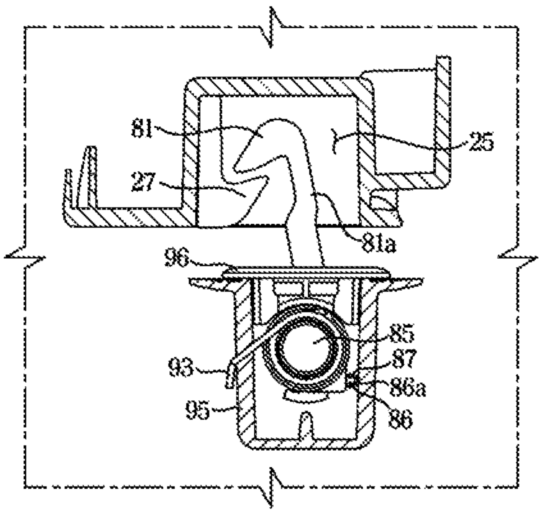
FIG. 11 is a cross-sectional view illustrating that the hook is locked in the hook locking groove according to an embodiment of the present disclosure.

FIG. 9 illustrates a coupling relationship between a hook and a transverse shaft according to an embodiment of the present disclosure, FIG. 10 is a view illustrating that a hook is locked in a hook locking groove according to an embodiment of the present disclosure, and FIG. 11 is a cross-sectional view illustrating that the hook is locked in the hook locking groove according to an embodiment of the present disclosure.

Referring to FIGS. 9 to 11, the hook 80 may be coupled to an upper side of the longitudinal shaft 61 to rotate integrally with the longitudinal shaft 61.

The hook 80 includes the hook part 81 formed to extend in the transverse direction with respect to the longitudinal shaft 61 to rotate together with the longitudinal shaft 61.

The hook part 81 may be positioned in the locking position in which the hook part 81 is locked in the hook locking groove 25 by an elastic force of a hook elastic member 90 in the initial position in which no external force is applied to the passive contact part 70, and when an external force is applied to the passive contact part 70 to rotate the longitudinal shaft 61 together with the passive contact part 70, the hook part 81 may be released from the hook locking groove 25.

In the initial position in which no external force is applied to the passive contact part 70, that is, when the hook part 81 rotates in a direction of being released from the hook locking groove 25 in a state in which the hook part 81 is locked in and supported on the hook locking groove 25, the movable contact part 50 and the passive contact part 70 do not interfere with each other due to the cutout portion 56. This structure prevents the operation of the hook part 81 from interlocking with the lever 42 when the outer door 20*b* closes the opening 24 of the inner door 20*a*, thereby reducing the generation of operational noise.

The hook 80 may be coupled to the upper end of the longitudinal shaft 61 to rotate integrally with the longitudinal shaft 61.

The hook 80 may include a body part 82 and the hook part 81 extending in a direction of crossing the longitudinal shaft 61 from an outer surface of the body part 82.

The hook 80 may be disposed in a hook housing 95 embedded inside the outer door 20*b*.

One side of the hook housing 95 may be open, and the open side may be sealed by a hook cap 96.

A passing hole 97 through which the hook part 81 protrudes may be formed on the hook cap 96.

The body part 82 may be formed in a cylindrical shape, a coupling part 83 into which the longitudinal shaft 61 is fitted is provided at a lower end of the body part 82, a spring mounting part 85 to which the hook elastic member 90 is coupled is provided at an upper end of the body part 82, and a stopper 86 protruding outward may be provided on the outer surface of the body part 82.

The coupling part 83 may include a fitting hole 83*a* and fitting slots 83*b* cut at opposite sides of the fitting hole 83*a*.

The longitudinal shaft 61 may be fixed to the body part 82 by a fastening member such as a bolt and a pin in a state in which the upper end thereof is fitted into the fitting hole 83*a*.

Fitting ribs 63 to be fitted into the fitting slots 83*b* may protrude from opposite sides of an outer surface of the longitudinal shaft 61.

When the upper end of the longitudinal shaft 61 is fitted into the fitting hole 83*a*, the fitting ribs 63 may be inserted along the fitting slots 83*b* to regulate a relative position of the hook part 81 with respect to the hook locking groove 25.

The hook part 81 may be formed to extend in the transverse direction from the outer surface of the body part 82.

The hook part 81 may protrude to the outside through the passing hole 97 provided on the hook cap 96.

The hook part 81 may rotate left and right with respect to the longitudinal shaft 61.

The hook part 81 may be provided at an end of a hook arm 81*a* extending in the transverse direction from the outer surface of the body part 82.

The hook part 81 may be supported by being caught on a hooking protrusion 27 provided inside the hook locking groove 25.

The hook part 81 may rotate counterclockwise with respect to the longitudinal shaft 61 to be caught on the hooking protrusion 27 or rotate clockwise to be released from the hooking protrusion 27.

The spring mounting part 85 may be formed in a cylindrical shape having a diameter smaller than that of the body part 82, and may be formed to extend upward a predetermined length from the upper end of the body part 82.

The hook elastic member 90 may be coupled to the spring mounting part 85.

An upper end of the spring mounting part 85 may be rotatably supported on a shaft support part 98 provided in the hook housing 95.

The hook elastic member 90 may include a body part 91 of a helical shape fitted to a spring mounting part 85, and a torsion spring having end portions 92 and 93 protruding from both upper and lower ends of the body part 91, respectively.

The end portions 92 and 93 of the hook elastic member 90 may be supported on the body part 82 and the hook housing 95, respectively.

The hook elastic member 90 may provide an elastic force for rotating the longitudinal shaft 61 in a direction in which the hook part 81 is caught on the hooking protrusion 27 provided in the hook locking groove 25.

The hook elastic member 90 may be provided to have a relatively smaller or equal elastic force than that of the handle elastic member 43. This is to ensure that a speed at which the manipulation handle 40 returns to an original position when an external force is applied to and then removed from the manipulation handle 40 is greater than a speed at which the hook part 81 returns to the locking position after released so that when the movable contact part 50 and the passive contact part 70 return to original positions, respectively, a collision due to the contact may be reduced. In addition, when the hook elastic member 90 is composed of a torsion spring, the movement of the longitudinal shaft 61 depending on gaps between the parts may be reduced due to the rotational trajectory of the passive contact part 70 operated by the movable contact part 50, thereby reducing noise generation due to the movement.

The stopper 86 may prevent the hook part 81 from rotating more than a predetermined angle when the hook part 81 rotates in the direction of being caught in the hook locking groove 25.

The stopper 86 may be formed to extend outwardly from the outer surface of the body part 82.

The stopper 86 may limit the rotation of the hook part 81 by coming into contact with the hook housing 95 during rotating in the direction in which the hook part 81 is locked.

The contact part **86*a* of the stopper 86 may be provided to come into line contact with the hook housing 95** in order to reduce noise generation upon a collision.

The contact part **86*a* of the stopper 86 may be formed in a semicircular cross-section. A buffer member 87 may be provided on the stopper 86** to reduce the generation of impact and noise upon contact.

The buffer member 87 may be made of a silicone or rubber material provided to surround an outer surface of the stopper 86.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

What is claimed is:

1. A refrigerator comprising:

a cabinet having a storage compartment;

an inner door rotatably coupleable to the cabinet to open and close the storage compartment, the inner door having an opening;

an outer door rotatably coupleable to a front of the inner door to open and close the opening of the inner door;

a hook locking groove formed on the inner door;

a manipulation handle provided to be rotatable with respect to a transverse shaft coupleable to the outer door and comprising a movable contact part; and a locking member provided to be rotatable with respect to a longitudinal shaft coupleable to the outer door, wherein the locking member comprises a hook lockable to and unlockable from the hook locking groove, and a passive contact part to selectively contact with the movable contact part, wherein the movable contact part rotates forward and rearward of the storage compartment with respect to the transverse shaft, and the passive contact part rotates forward and rearward of the storage compartment with respect to the longitudinal shaft.

2. The refrigerator according to claim 1, wherein the passive contact part is provided not to interfere with the movable contact part while the hook rotates along a direction in which the hook is released from the hook locking groove in a state in which the movable contact part and the passive contact part are spaced apart from each other.

3. The refrigerator according to claim 1, wherein the movable contact part comprises a fence having an inner surface that is spaced apart from the passive contact part by a predetermined distance and formed to surround a circumference of the passive contact part, and an open cutout portion is provided on one side of the fence to prevent interference upon relative rotation of the passive contact part and the movable contact part.

4. The refrigerator according to claim 3, wherein a buffer member is coupleable to the inner surface of the fence.

5. The refrigerator according to claim 1, wherein at least one of the movable contact part and the passive contact part is provided with a buffer member.

6. The refrigerator according to claim 3, wherein the passive contact part comprises a first arm formed to extend from the longitudinal shaft toward an upper portion of the movable contact part, and a second arm formed to extend from the first arm toward an inside of the fence.

7. The refrigerator according to claim 6, wherein the open cutout portion is provided to have a width allowing the second arm to pass therethrough.

8. The refrigerator according to claim 1, wherein the manipulation handle comprises a lever formed to extend to a lower portion of the transverse shaft, and the movable contact part is formed to extend to an upper portion of the transverse shaft from a position adjacent to an end of the transverse shaft.

9. The refrigerator according to claim 1, further comprising a hook elastic member to provide an elastic force along a direction in which the hook is locked in the hook locking groove.

10. The refrigerator according to claim 9, further comprising a handle elastic member to provide an elastic force for rotating the transverse shaft so that the manipulation handle returns to an original position after rotation.

11. The refrigerator according to claim 10, further comprising a hook housing formed to be embedded inside the outer door to receive a portion of the hook, wherein the handle elastic member comprises a torsion spring coupleable to the transverse shaft and having opposite ends supported on the outer door and the manipulation handle, respectively, and the hook elastic member comprises a torsion spring coupleable to the longitudinal shaft and having opposite ends supported on the longitudinal shaft and the hook housing, respectively.

12. The refrigerator according to claim 10, wherein the hook comprises a body part having a coupling part coupleable to the longitudinal shaft at a lower end and a spring mounting part to which the hook elastic member is coupleable at an upper end, and a hook part formed to extend along a direction of crossing the longitudinal shaft from an outer surface of the body part.

13. The refrigerator according to claim 12, further comprising a stopper formed to protrude from an outer surface of the body part to prevent the hook from rotating more than a predetermined angle, wherein the stopper is provided with a buffer member.

14. The refrigerator according to claim 1, further comprising a shaft housing formed to be embedded inside the outer door to surround the longitudinal shaft so as to rotatably support the longitudinal shaft.

* * * * *